United States Patent [19]

Doi et al.

[11] Patent Number: 4,827,730

[45] Date of Patent: May 9, 1989

[54] TROUBLESHOOTING APPARATUS FOR AUTOMOBILE AIR-CONDITIONING SYSTEM

[75] Inventors: Shigetoshi Doi; Yoshiaki Anan; Hirofumi Nagaoka, all of Hiroshima; Katsumi Iida; Yoshihiko Sakurai, both of Konan, all of Japan

[73] Assignees: Mazda Motor Corporation, Hiroshima; Diesel Kiki Co., Ltd., Tokyo, both of Japan

[21] Appl. No.: 133,920

[22] Filed: Dec. 16, 1987

[30] Foreign Application Priority Data

Dec. 16, 1986 [JP] Japan ................................ 61-299712
Dec. 16, 1986 [JP] Japan ................................ 61-299713

[51] Int. Cl.$^4$ ............................................. F25B 49/00
[52] U.S. Cl. ........................................ 62/127; 62/129; 165/11.1; 236/94
[58] Field of Search ................. 62/125, 126, 127, 128, 62/129, 130, 161, 163; 236/94; 165/11.1; 364/551, 557

[56] References Cited

U.S. PATENT DOCUMENTS

| | | | |
|---|---|---|---|
| 4,432,210 | 2/1984 | Saito | 364/557 X |
| 4,490,986 | 1/1985 | Paddock | 62/127 |
| 4,535,598 | 8/1985 | Mount | 62/126 |
| 4,653,280 | 3/1987 | Hanson et al. | 62/127 |
| 4,663,940 | 5/1987 | Suzuki et al. | 236/94 X |

FOREIGN PATENT DOCUMENTS 56-68505 6/1981 Japan.

Primary Examiner—Harry B. Tanner
Attorney, Agent, or Firm—Birch, Stewart, Kolasch & Birch

[57] ABSTRACT

A troubleshooting apparatus counts the number of times an abnormality occurs whenever each diagnosed portion of an automobile air-conditioning system repeats an abnormal and a normal status, stores each diagnosed portion in which an abnormality is detected and the number of times the abnormality of each diagnosed portion occurs in a nonvolatile memory, recognizes each diagnosed portion having the number of times the abnormality exceeds a predetermined value at the time of troubleshooting as a fault, and recognizes each diagnosed portion having an abnormality that occurs at the time of troubleshooting as a fault. Abnormalities that occur in conjunction with the dismounting and remounting of diagnosed portions during checking processes are absorbed in the number of times the abnormality occurs within the predetermined value so that a wrong diagnosis can be avoided. Moreover, each diagnosed portion having the number of times the abnormality exceeds the predetermined value and each diagnosed portion having an abnormality that occurs during the diagnostic process can be distinguished from each other. Consequently, check and repairs can be based on an understanding of whether or not the abnormality lacks repeatability such as an imperfect contact and a half-disconnection.

15 Claims, 10 Drawing Sheets

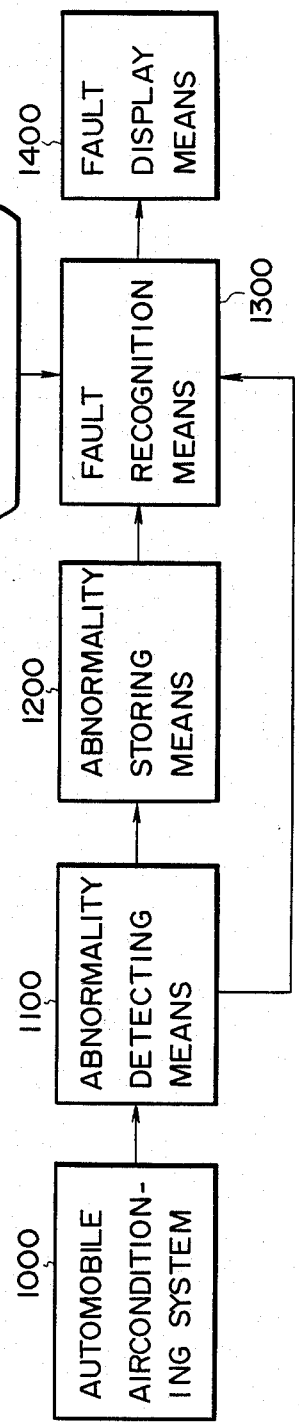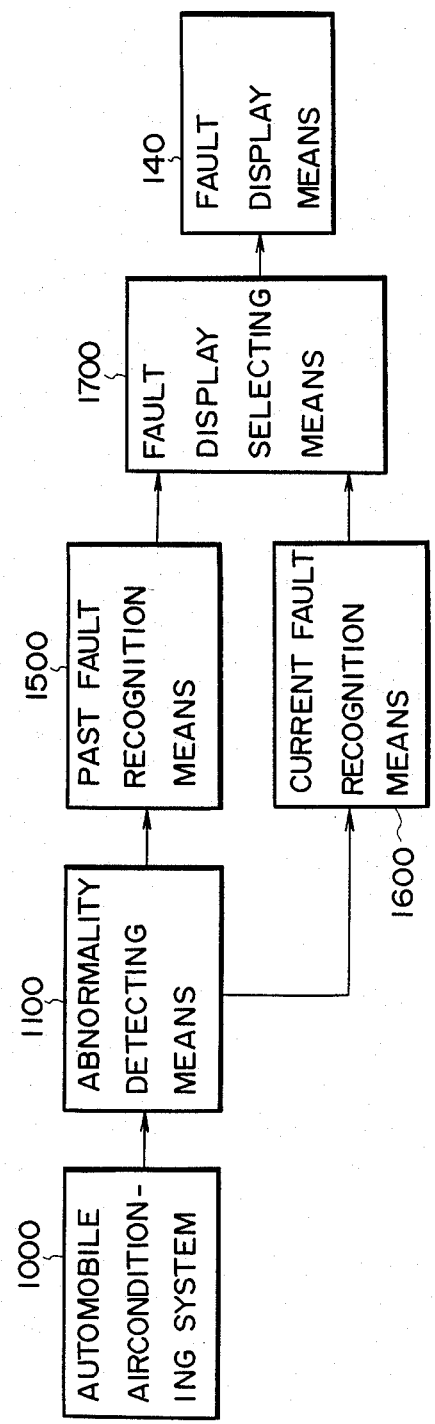

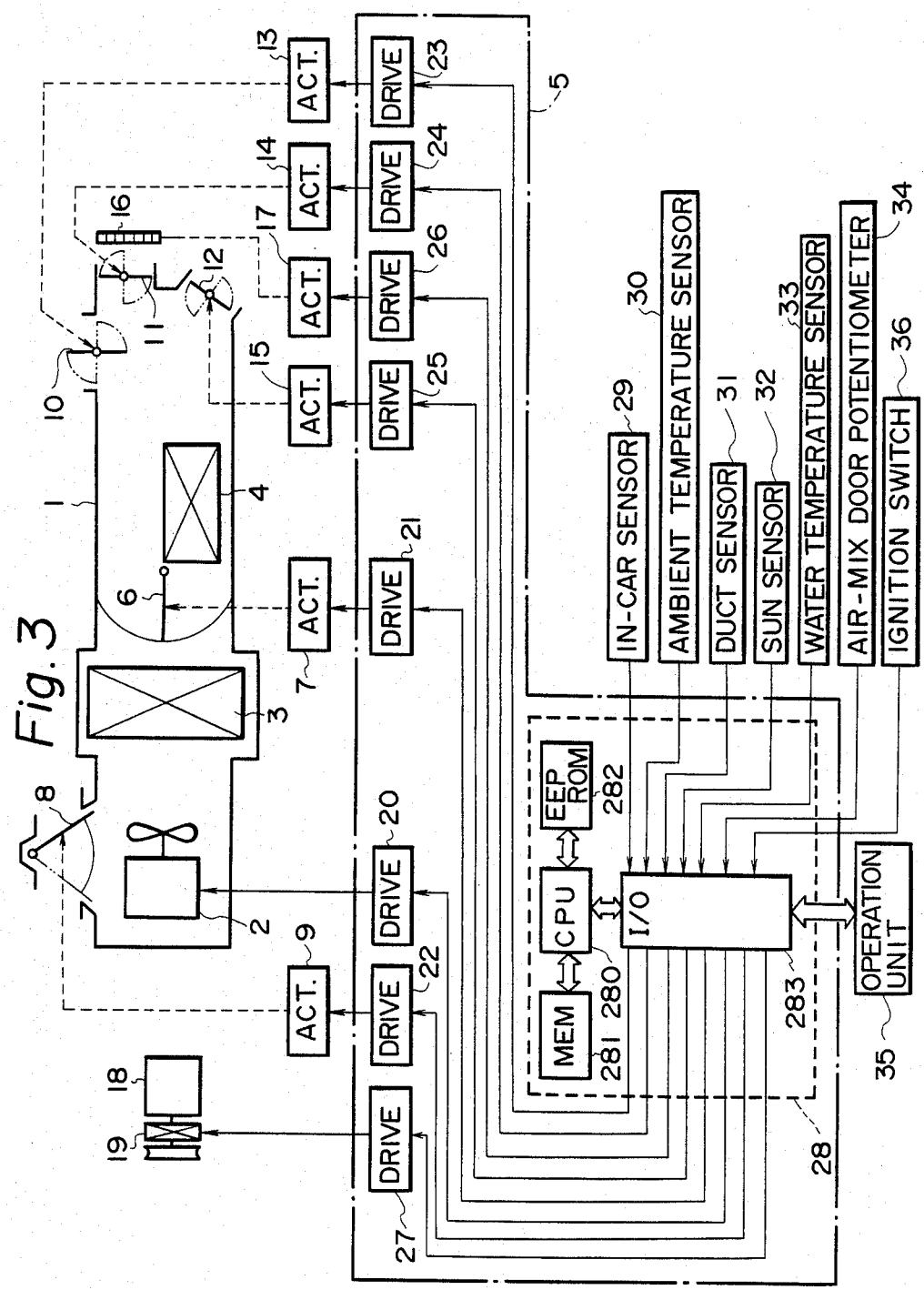

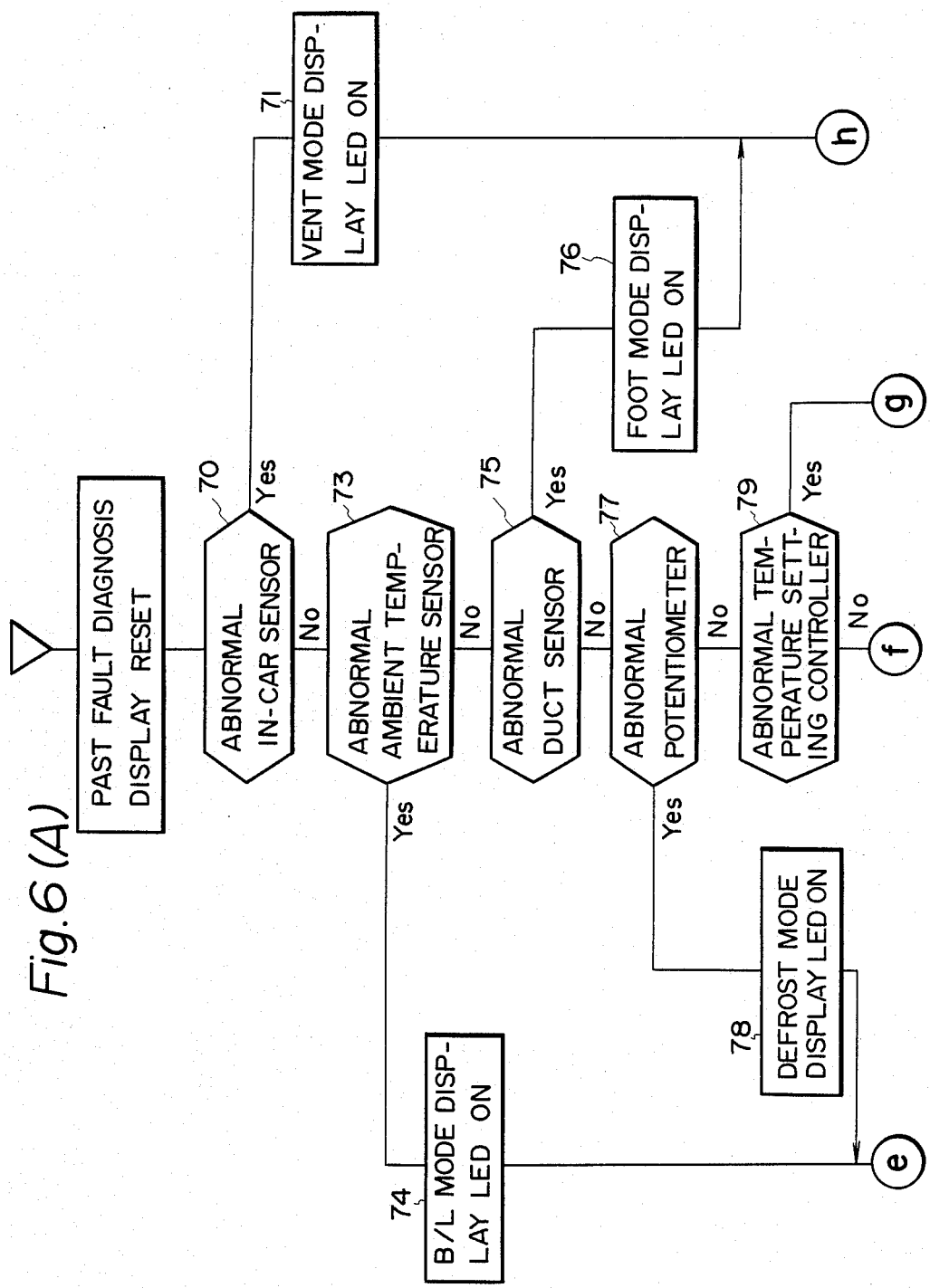

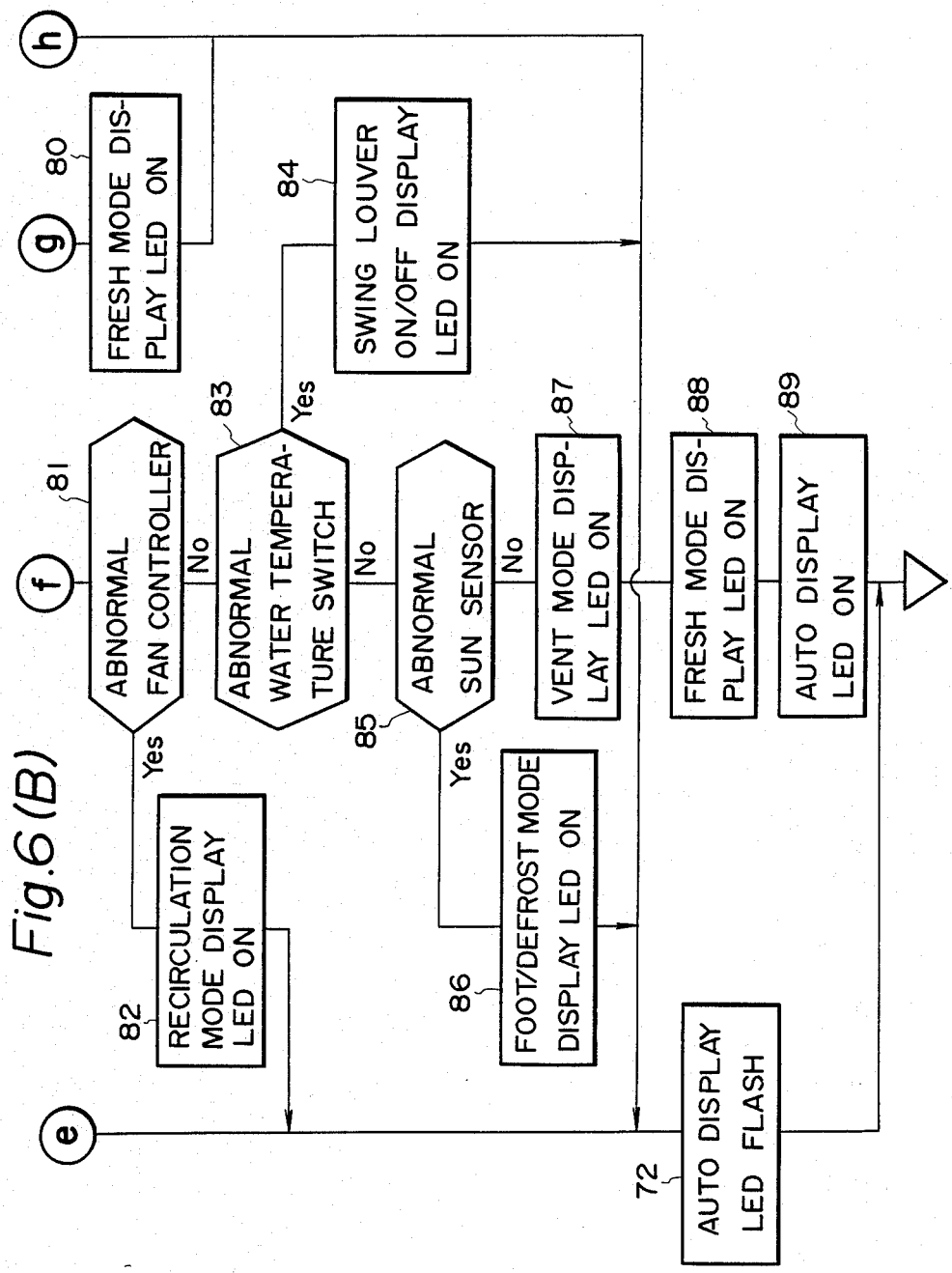

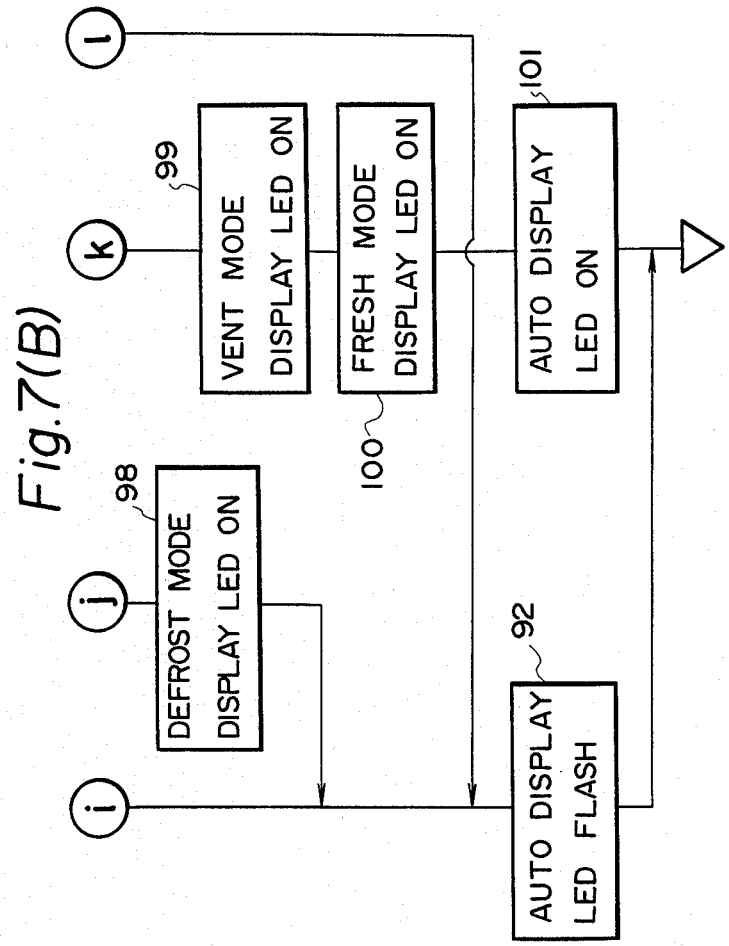

TROUBLESHOOTING APPARATUS FOR AUTOMOBILE AIR-CONDITIONING SYSTEM

BACKGROUND OF THE INVENTION

The present invention relates to an apparatus for diagnosing each fault portion in an automobile air-conditioning system.

In an automobile air-conditioning system, a blower and an air-mix door are controlled automatically so that an in-car temperature becomes a set temperature based on detected information from various sensors and operational information from an operation unit. Therefore, if any abnormalities occur in these sensors and operation units, then the desired air-conditioning would be unable to perform. The troubleshooting operation to find each fault portion is generally done by checking component factors of an electric system, by using a diagnosing device such as a tester and by using the experience of a repairman and maintenance manual. If a fault portion presents any abnormality during troubleshooting operation, it is easy to find the fault portion by the above manner. However, in the case of an imperfect contact or a half-disconnection, the abornormality does not always show and often does not repeat. Consequently, it sometimes occurs that such an abnormality does not appear at the time of the troubleshooting operation. In such case it is not possible to find the abnormality in spite of its existence.

Japanese Utility Model Laid Open Publication No. 56-67505 discloses an apparatus for diagnosing inconsistent and non-repeatable fault portions. This apparatus detects each diagnosed portion in which an abnormality occurs, stores each detected diagnosed portion in a nonvolatile memory, reads out the contents of said memory when a key switch is turned on, and displays each detected diagnosed portion. Since a diagnosed portion having an abnormality that occurs even once is stored in the nonvolatile memory, it is possible to know fault diagnosed portions having an abnormality that is inconsistent and non-repeatable.

However, the prior diagnosing apparatus has disadvantages as described below.

According to the prior diagnosing apparatus, a diagnosed portion, even when the diagnosed portion is normal, will be diagnosed to be a fault portion. That is to say, when the diagnosed portion is dismounted and remounted due to inspections or checkings, a malfunction that occurs during such dismounting and remounting operations is detected, and the diagnosed portion is diagnosed as the fault portion. Namely, since it is not possible to distinguish dismountings/remountings from true faults, even mere dismountings/remountings of diagnosed portions done during inspections or checkings will be diagnosed as faults.

Also, according to the prior diagnosing apparatus, diagnosed portions, which have any abnormalities occurring when the key switch is turned on, are displayed without being distinguished from other diagnosed portions which have abnormalities that occur before the key switch is turned on but do not repeat when the switch is turned on. Consequently, it is not possible to know if the diagnosed portions displayed as abnormalities are fault portions, which occur during diagnosing, or fault portions, which occur before diagnosing and lack repeatability. If these facts can be distinguished, then checking and repairing can be based on an understanding of whether or not abnormalities lacking repeatability. Thereby, finding any cause of such abnormalities as well as applying suitable remedy measures can be facilitated.

SUMMARY OF THE INVENTION

It is an object, therefore, of the present invention to overcome the disadvantages and limitations of the prior diagnosing apparatus by providing a new and improved troubleshooting apparatus.

Another object of the present invention is to provide a troubleshooting apparatus that is effective for preventing a wrong diagnosis for the dismountings/remountings of diagnosed portions during inspections or checkings.

Still another object of the present invention is to provide a troubleshooting apparatus which can identify diagnosed portions having abnormalities that occur during a diagnosis from other diagnosed portions having abnormalities that occur before the diagnosis and lack repeatability by distinguishing the diagnosed portions from each other.

The above and other objectives are attained by a troubleshooting apparatus for detecting each fault of the diagnosed portions in an automobile air-conditioning system. The apparatus comprises abnormality detecting means for detecting each abnormality of the diagnosed portions; abnormality storing means, responsive to a detection of an abnormality in said abnormality detecting means, for counting the number of times an abnormality for each diagnosed portion occurs whenever each diagnosed portion repeats an abnormal or normal status, and for storing each diagnosed portion from which an abnormality is detected and the number of times an abnormality of each diagnosed portion into a rewritable nonvolatile memory; past fault recognition means for recognizing, when troubleshooting, each diagnosed portion having the number of times an abnormality exceeds a predetermined value, as a fault based on the stored contents of the abnormality storing means; current fault recognition means for recognizing, when troubleshooting, each diagnosed portion, having an abnormality that occurs, as a fault based on the detection of the abnormality detecting means; and fault display means, responsive to the recognition of the past fault recognition means and the current fault recognition means, for displaying each diagnosed portion recognized as a fault.

Also, the above and other objects are attained by a troubleshooting apparatus for detecting each fault of the diagnosed portion in an automobile air-conditioning system. The apparatus comprises abnormality detecting means for detecting abnormalities of the diagnosed portions; abnormality storing means, responsive to a detection of an abnormality from the an abnormality from detecting means, for counting the number of times of abnormity of each diagnosed portion whenever each diagnosed portion repeats an abnormal or normal status, and for storing each diagnosed portion from which an abnormality is detected and the number of times an abnormality of each diagnosed portion into a rewritable nonvolatile memory; past fault recognition means for recognizing, when troubleshooting, each diagnosed portion having the number of times an abnormality exceeds a predetermined value, as a fault based on the stored contents of the abnormality storing means; current fault recognition means for recognizing, when troubleshooting, each diagnosed portion, having an abnormality that occurs, as a fault based on the detection of the abnormality detecting means; fault display selecting means, responsive to an operation of an existing switch of an operation unit of the automobile airconditioning system when troubleshooting, for selecting alternatively a recognized information of the past fault recognition means and recognized information of the current fault recognition means; and fault display means, responsive to a selected recognized information from the fault display selecting means, for displaying each diagnosed portion recognized as a fault.

BRIEF DESCRIPTION OF THE DRAWINGS

The foregoing and other objects, features and advantages of the present invention will be appreciated as the same and will become better understood by means of the following description and accompanying drawings wherein;

FIG. 1 is a block diagram showing a first fundamental embodiment of a diagnosing apparatus according to the present invention, FIG. 2 is a block diagram showing a second fundamental embodiment of a diagnosing apparatus according to the present invention, FIG. 3 is a block diagram showing a preferred embodiment of a diagnosing apparatus according to the present invention.

DETAILED DESCRIPTION OF THE INVENTION

Figure 4:
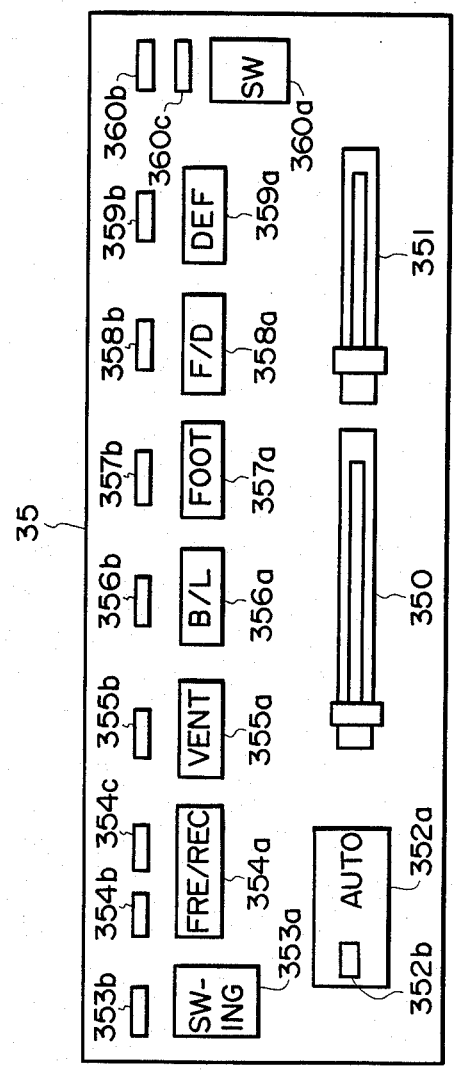
FIG. 4 is a drawing showing an operation unit of FIG. 3, FIGS. 5(A), 5(B) and 5(C) are flow diagrams of a control unit of FIG. 3, FIGS. 6(A) and 6(B) are flow diagrams showing a current fault diagnostic processing of FIG. 5(C), and FIGS. 7(A) and 7(B) are flow diagrams showing a past fault diagnostic processing of FIG. 5(C).

In a first fundamental embodiment of FIG. 1, an automobile airconditioning system 1000 controls automatically a blower and an air-mix door so that an in-car temperature becomes a set temperature based on detected information from various sensors and operational information from an operation unit. Various sensors include an in-car sensor, an ambient temperature sensor, a sun sensor, a duct sensor, a potentiometer and a water temperature switch. The in-car sensor detects an in-car temperature of an automobile. The ambient temperature sensor detects an outside temperature of the automobile. The sun sensor detects a quantity of solar radiation which the automobile receives. The duct sensor detects a temperature for the air blown out from an evaporator. The potentiometer detects an opening angle of the airmix door. The water temperature switch detects whether or not a water temperature of a heater core is above a preset value. The operation unit includes a temperature setting controller for providing a set temperature, and a fan controller for adjusting the blower speed. The in-car sensor, ambient temperature sensor, sun sensor, duct sensor, potentiometer and water temperature switch, temperature setting controller and the fan controller are monitored as diagnosed portions by abnormality detecting means 1100. The abnomality detecting means 1100 detect an abnormality of each diagnosed portion, and give an abnormality information to abnormality storing means 1200 and fault recognition means 1300. The abnormality storing means 1200, that is responsive to the abnormality information from the abnormality detecting means 1100, count the number of times an abnormality occurs each diagnosed portion, and store each diagnosed portion having an abnormality that occurs and the number of times an abnormality occurs on a rewritable nonvolatile memory. The number of times abnormality occurs relates to the numer of times a normal/abnormal status repeats. When an imperfect contact and a half-disconnection are the cause of an abnormality, such fault diagnosed portions often repeat a normal and abnormal status from the vibration of the automobile. The fault recognition means 1300, that is responsive to a troubleshooting request, is based on the storage contents of the abnormality storing means 1200, and recognize each diagnosed portion having the number of times an abnormality exceeds a predetermined value as a fault. Recognize each diagnosed portion having abnormalities occur when troubleshooting request is issued, recognizes a fault based on the abnormality information from the abnormality detecting means 1100. The fault recognition means 1300 give the recognized information to fault display means 1400. The fault display means 1400, that is responsive to the recognized information of the fault recognition means 1300, display each diagnosed portion that is recognized as a fault. Dismountings/remountings of diagnosed portions during inspections or checkings are absorbed as the number of times an abnormality occurs within the predetermined value. As a result, it prevents malfunctions of diagnosed portions due to dismountings and remountings that are diagnosed as faults.

In a second fundamental embodiment shown in FIG. 2, the automobile air-conditioning system 1000 and the abnormality detecting means 1100 have already been mentioned in the first fundamental embodiment. Each of abnormality information from the abnormality detecting means 1100 is given to past fault recognition means 1500 and current fault recognition means 1600. The past fault recognition means 1500, responsive to the abnormality information of the abnormality detecting means 1100, recognize each diagnosed portion a fault based on the abnormalities that occur before diagnosing. More specifically, the past fault recognition means 1500, responsive to the abnormality information of the abnormality detecting means 1100, count the number of times an abnormality occurs from of each diagnosed portion, and store each diagnosed portion in which an abnormality occurred and the number of times an abnormality occurs in a rewritable nonvolatile memory. Then the past fault recognition means 1500, responsive to a request for troubleshooting, recognize each diagnosed portion, of which the number of times an abnormality occurs is stored in the nonvolatile memory exceeds a predetermined value, to be in fault. The recognized information of the past fault recognition means 1500 is given to fault display selecting means 1700. The current fault recognition means 1600, responsive to the abnormality information of the abnormality detecting means 1100, recognize each diagnosed portion, in which abnormalities occur when the request for troubleshooting is given, to be in fault, and give the recognized information to the fault display selecting means 1700. While the request for troubleshooting is given, the fault display selecting means 1700, responsive to a operation of an existing switch of an operation unit of the air-conditioning system 1000, select alternatively the recognized information of the past fault recognition means 1500 and the recognized information of the current fault recognition means 1600, and give selected recognized information to fault display means 1400. The fault display means 1400, responsive to the selected recognized information from the fault display selecting means 1700, display each diagnosed portion recognized as a fault, as mentioned in the first fundamental embodiment. With the recognized information of the past fault recognition means 1500 being selected, each diagnosed portion recognized to be in fault is displayed based on the number of times an abnormality occurs before diagnosing. With the recognized information of the current fault recognition means 1600 being selected, each diagnosed portion in which an abnormality occurs during diagnosing, is displayed.

The contents of the first fundamental embodiment and the second fundamental embodiment will be understood more clearly by a preferred embodiment described in the following.

In FIG. 3, a reference numeral 1 is a duct of an automobile air-conditioning system. In the duct 1, a blower 2, an evaporator 3 and a heater core 4 are provided. The speed of the blower 2 is controlled by a control apparatus 5. The evaporator 3 and the heater core 4 are provided downstream from the blower 2. Between the evaporator 3 and the heater core 4, there is provided an air-mix door 6 for adjusting a mix ratio of cold air and warm air. An opening angle of the air-mix door 6 is controlled by an actuator 7, which is under the control of the control apparatus 5. At the upstream most part from the duct 1, there is provided an intake door 8 for selecting intake of either in-car air or ambient air. The intake door 8 is controlled by an actuator 9, which is under the control of the control apparatus 5. At the downstream most part from the duct 1, there are provided a defroster door 10 for operating a defroster outlet, a vent door 11 for operating a vent outlet, and a floor door 12 for operating a floor outlet. Operation of these doors 10, 11 and 12 are respectively controlled by actuators 13, 14 and 15, which are under the control of the control apparatus 5. At the vent outlet, there is provided a swing louver 16. The swing louver 16 is controlled by an actuator 17, which is under the control of the control apparatus 5. A reference numeral 18 is a compressor of the air-conditioning system. The connection of the compressor 18 with an engine (not shown) is switched on and off by an electromagnetic clutch 19, which is controlled by the control apparatus 5.

The control apparatus 5 includes a blower drive circuit 20, an air-mix door drive circuit 21, an intake door drive circuit 22, a defroster door drive circuit 23, a vent door drive circuit 24, a floor door drive circuit 25, a swing louver drive circuit 26, a compressor drive circuit 27, and a control unit 28 for giving control signals to these drive circuits. The control unit 28 provides a CPU 280 for performing air-conditioning control and troubleshooting, a memory 281 for storing a control program fixed data and necessary data temporarily, an electrically rewritable nonvolatile EEPROM (Electrically Erasable and Programmable ROM) 282, and an I/O (Input/Output) circuit 283. The control unit 28 provides the control signals to each of the drive circuits via the I/O circuit 283. A reference numeral 29 is an in-car sensor for detecting an in-car temperature. A reference numeral 30 is an ambient temperature sensor for detecting an atmospheric temperature outside of the automobile. A reference numeral 31 is a duct sensor, provided between the evaporator 3 and the air-mix door 6, for detecting a temperature of air blown out from the evaporator 3. A reference numeral 32 is a sun sensor, provided on a dashboard surface, for detecting a quantity of solar radiation which the automobile receives. A reference numeral 33 is a water temperature switch, which is provided at the heater core 4 and is switched on/off depending on whether or not the water temperature of the heater core 4 is above a predetermined value. A reference numeral 34 is a potentiometer for detecting an opening angle of the air-mix door 6. Each detected information of these sensors is provided via the I/O circuit 283 to the control unit 28. A reference numeral 35 is an operation unit. Operational information of the operation unit 35 is also provided via the I/O circuit 283 to the control unit 28. A reference numeral 36 shows an ignition switch, and on/off information is provided from the ignition switch 36 to the control unit 28.

FIG. 4 is a drawing showing an example of the operation unit 35. A reference numeral 350 shows a temperature setting controller, composed of a variable resistor, for producing a set temperature. A reference numeral 351 shows a fan controller, composed of a variable resistor, for adjusting the blower speed. A reference numeral 352a shows an auto switch for requesting air-conditioning control in an auto mode, and a reference numeral 352b shows an auto display LED (Light Emitting Diode). A reference numeral 353a shows a swing louver switch for switching the swing louver 16 on and off, and a reference numeral 353b shows a swing louver on/off display LED. A reference numeral 354a shows an intake door changeover switch, a reference numeral 354b shows a fresh mode display LED, and a reference numeral 354c shows a recirculation mode display LED. A reference numeral 355a shows a vent mode switch, and a reference numeral 355b shows a vent mode display LED. A reference numeral 356a shows a B/L (Bi-Level) mode switch, and a reference numeral 356b shows a B/L mode display LED. A reference numeral 357a shows a foot mode switch, and a reference numeral 357b shows a foot mode display LED. A reference numeral 358a shows a foot/defrost mode switch, and a reference numeral 358b shows a foot/defrost mode display LED. A reference numeral 359a shows a defrost mode switch, and a reference numeral 359b shows a defrost mode display LED. A reference numeral 360a shows a three-step compressor switch. This switch 360a switches between an A/C (Air-conditioning) mode which controls the compressor 18 irrespective of heat load between the on/off temperatures 0° C./3° C. for example, an ECO (Economy) mode which controls the compressor 18 by varying the on/off temperatures according to heat load, and an off mode which places the compressor 18 in an off condition. A reference numeral 360b shows an A/C mode display LED, and a reference numeral 360c shows an ECO mode display LED. The control unit 28, based on the operational information supplied from the operation unit 35 and the detected information supplied from the detected means 29 through 34, performs well-known in-car air-conditioning control by controlling the blower 2, air-mix door 6, intake door 8, mode doors 10 through 12 and the compressor 18. The control unit 28 also performs troubleshooting of the in-car sensor 29, ambient temperature sensor 30, duct sensor 31, sun sensor 32, water temperature switch 33, air mix door potentiometer 34, temperature setting controller 350 and the fan controller 351.

Figure 5A:
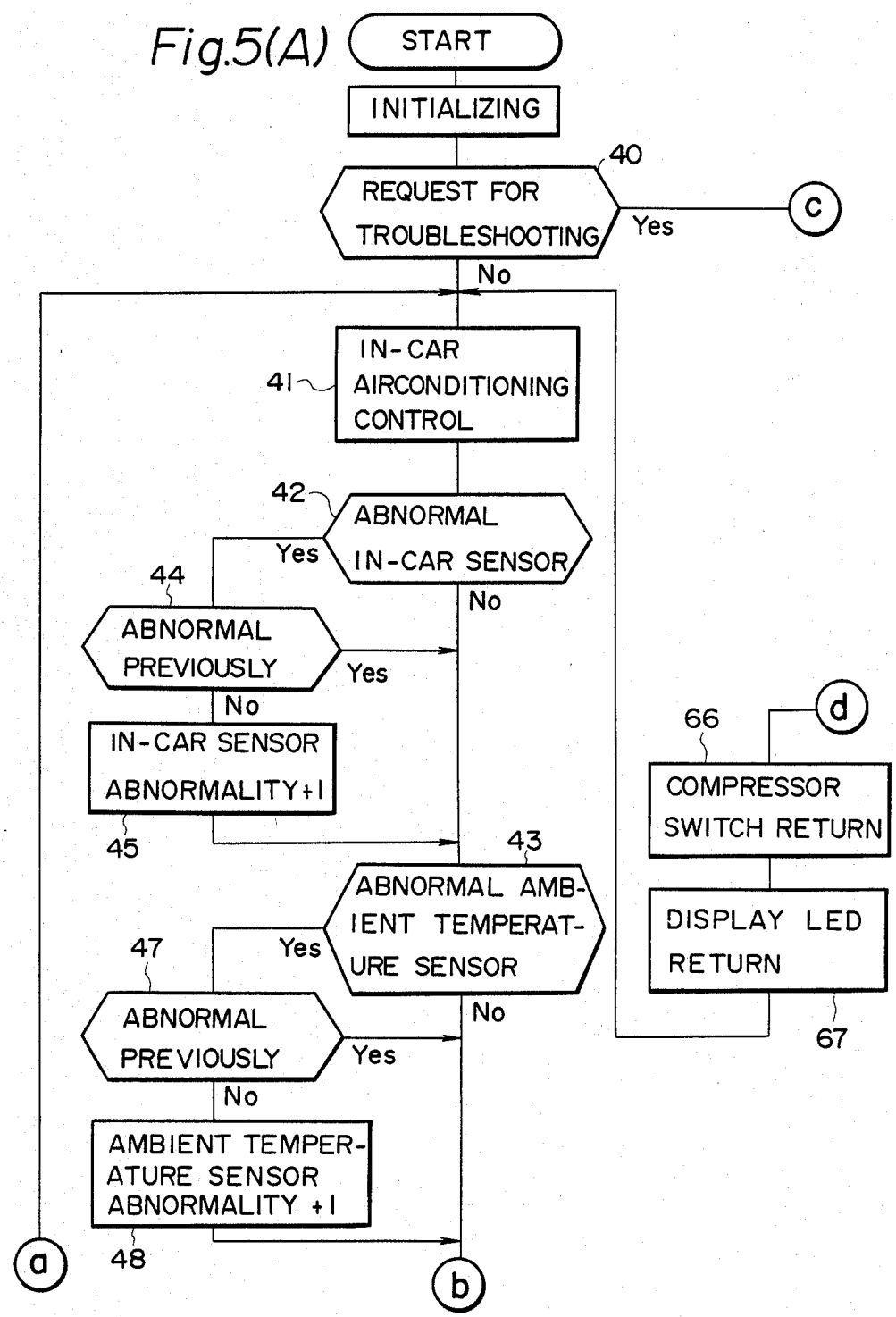
Figure 5B:
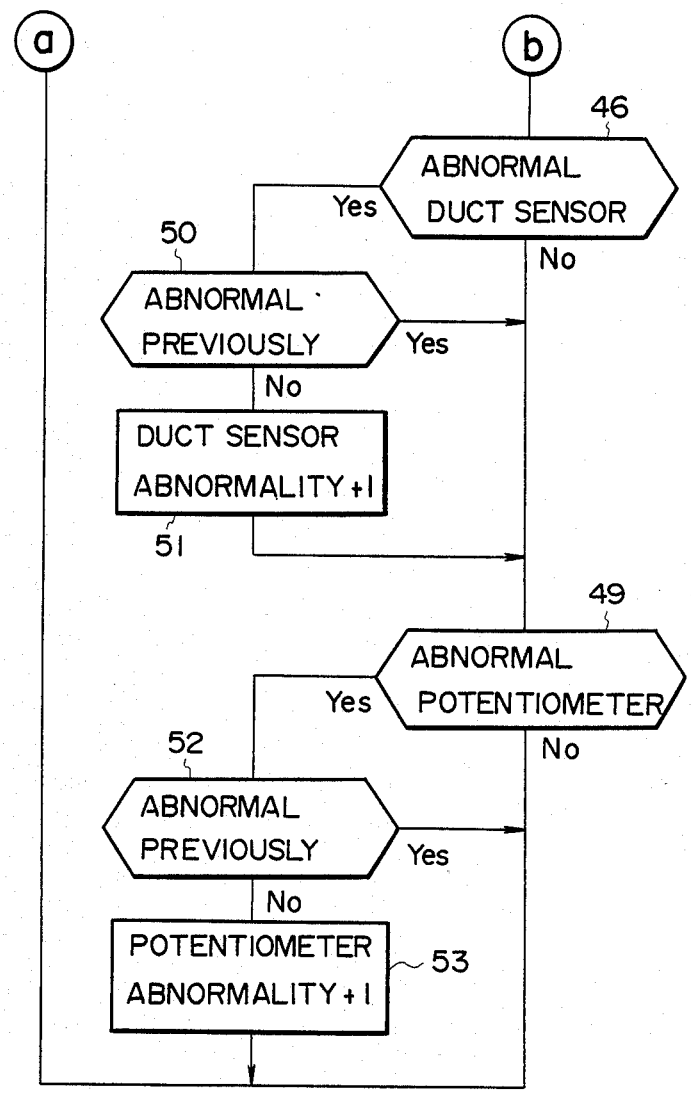
Figure 5C:
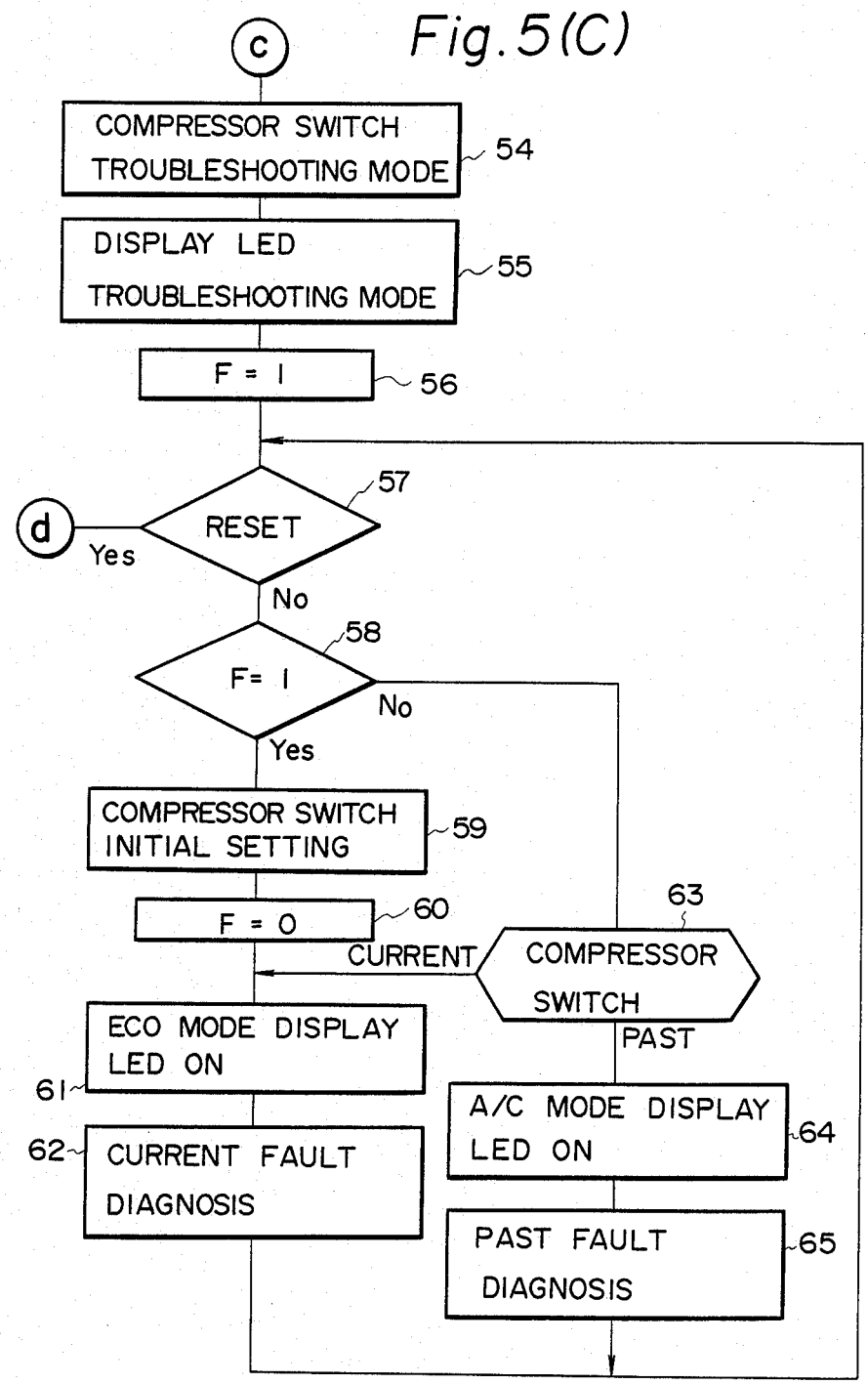

FIGS. 5(A), 5(B) and 5(C) show flow diagrams of the control unit 28. Terminals a-d of FIG. 5(A) are connected to corresponding terminals a-d of FIGS. 5(B) and 5(C).

When the ignition switch 36 is turned on, the program starts, and at a step 40 after initialization is performed, a judgement is made on whether or not troubleshooting is has been requested. This judgement is performed based on whether or not a condition representing two different switches of the operation unit 35 exists, for example, the auto switch 352a and defrost mode switch 359a being pressed simultaneously. When the auto switch 352a and defrost mode switch 359a are pressed simultaneously, troubleshooting is performed, otherwise an air-conditioning control is performed. The judgement on whether the request for troubleshooting is performed only once following the initialization after the ignition switch 36 is turned on. Therefore, it is necessary to request troubleshooting to turn the ignition switch 36 on while both the auto switch 352a and defrost mode switch 359a are pressed. Thereby, any careless setting of the troubleshooting mode is prevented from occurring.

If the judgement determines that there is not a request for troubleshooting at the step 40, well-known air-conditioning control is performed, based on the operational information of the operation unit 35 and the detected information of the detecting means 29 through 34. Following the air-conditioning control, abnormality detection of the in-car sensor 29, ambient temperature sensor 30, duct sensor 31 and air-mix door potentiometer 34 is performed. The program, after the abnormality detection, returns to the air-conditioning control of the step 41. If the detecting means 29, 30, 31 and 34 detect any abnormalities by well-known means for detecting disconnection, imperfect contact or shortcircuit, for example, by determining whether or not each signal from these detecting means satisfies a predetermined normal value range. Abnormality detection of the in-car sensor 29 is performed at a step 42. When the in-car sensor 29 is determined to be normal, abnormality detection of the ambient sensor of a step 43 is performed. If the in-car sensor 29 is determined to be abnormal, a step 44 is executed. In the step 44 it is determined, whether or not the in-car sensor 29 was abnormal at the previous passage of the program. When the in-car sensor 29 was normal at the previous passage of the program, a step 45 is executed. If the in-car sensor 29 was abnormal at the previouse passage of the program, abnormality detection of the ambient temperature sensor 30 of the step 43 is performed. In the step 45, the number of abnormalities that occur in the in-car sensor 29 is an abnormality occurs increment of one, and fault portion data representing the in-car sensor 29 and data containing the number of times an abnormality occurs are stored in the EEPROM 282. Thereafter, abnormality detection by the ambient temperature sensor 30 of the step 43 is performed. When the ambient temperature sensor 30 is determined to be normal in the step 43, abnormality detection of the duct sensor 31 of a step 46 is performed. If the ambient temperature sensor 30 is determined to be abnormal, a step 47 is executed. In the step 47, it is determined whether or not the ambient temperature sensor 30 was abnormal at the previous passage of the program. When the ambient temperature sensor 30 was normal at the previous passage of the program, a step 48 is executed. If the ambient temperature sensor 30 was abnormal at the previous passage of the program, abnormality detection of the duct sensor 31 by the step 46 is performed. In the step 48, the number of times an abnormality of the ambient temperature sensor 30 occurs is increased by an increment of one, and the fault portion data representing the ambient temperature sensor 30 and data containing the number of times an abnormality occurs are stored in the EEPROM 282. Thereafter, abnormality detection of the duct sensor 31 by the step 46 is performed. When the duct sensor 31 is judged to be normal in the step 46, abnormality detection of the air-mix door potentiometer 34 of a step 49 is performed. If the duct sensor 31 is judged to be abnormal, a step 50 is executed. In the step 50, it is determined whether or not the duct sensor 31 was abnormal at the previous passage of the program. When the duct sensor 31 was normal at the previous passage of the program, a step 51 is executed. If the duct sensor 31 was abnormal at the previous passage of the program, abnormality detection of the air-mix door potentiometer 34 of the step 49 is performed. In the step 51 the number of times an abnormality of the duct sensor 31 occurs is increased by an increment of one, and the fault portion data representing the duct sensor 31 and data containing the number of times an abnormality occurs are stored in the EEPROM 283. Thereafter, abnormality detection of the air-mix door potentiometer 34 of the step 49 is performed. When the air-mix door potentiometer 34 is judged to be normal in the step 49, the program returns to the air-conditioning control of the step 41. If the potentiometer 34 is judged to be abnormal, a step 52, is executed. In the step 52 it is determined whether or not the potentiometer 34 was abnormal at the previous passage of the program. When the potentiometer 34 was normal at the previous passage of the program, a step 53 is executed. If the potentiometer 34 was abnormal at the previous passage of the program, the program is returned to the air-conditioning control of the step 41. In the step 53, the number of times an abnormality of the potentiometer 34 occurs is increased by an increment of one, and the fault portion data representing the potentiometer 34 and data containing the number of times an abnormality occurs are stored in the EEPROM 282. Thereafter, the program is returned to the air-conditioning control of the step 41. By means of these operations, abnormality of detection each of the in-car sensor 29, ambient temperature sensor 30, duct sensor 31 and air-mix door potentiometer 34 during the air-conditioning control is performed. The number of times an abnormality occurs in each operation is stored in the nonvolatile memory.

When it is judged that there is a request for troubleshooting in the step 40, steps 54 and 55 are executed. In the step 54, the compressor switch 360a of the operation unit 35 is switched to the troubleshooting mode. In the step 55, all of the display LEDs of the operation unit 35 are switched to the troubleshooting mode. The compressor switch 360a, by switching to the troubleshooting mode, becomes a selection switch, as mentioned in the later part, for selecting alternatively a current fault diagnosis and a past fault diagnosis. The display LEDs, by switching to the troubleshooting mode, display each fault portion that occurs during troubleshooting, and displaying show either of the current fault diagnosis or the past fault diagnosis that is selected. By flashing the auto display LED 352b, any fault portions are displayed. By the mode display LEDs 355b, 356b, 357b, 358b and 359b, the recirculation and fresh mode display LEDs 354b and 354c and the swing louver on/off display LED 353b, each fault portion is displayed. By lighting of the vent mode display LED 355b, fresh mode display LED 354b and the auto display LED 352b, the normal status of all diagnosed portions is displayed. By lighting of the A/C mode display LED 360b, selection of the past fault diagnosis is displayed, and by lighting of the ECO mode display LED 360c, selection of the current fault diagnosis is displayed. After switching to the trouble-shooting mode, a flag F is made "1" in a step 56, and a judgement on the diagnosis reset is performed in the following step 57. The diagnosis reset is judged based on whether or not the condition represents two different switches of the operation unit 35, for example, the condition of the auto switch 352a and intake door changeover switch 354a being pressed simultaneously. When both the auto switch 352a and intake door changeover switch 354a are pressed simultaneously, the fault diagnosis is reset, and the air-conditioning control of the step 41 is performed, otherwise a step 58 is executed. In the step 58, a judgement of the flag F is performed. For the first passage of the program after the request for trouble-shooting, the flag F is "1". Therefore, steps 59, 60, 61 and 62 are executed. In the step 59, the compressor switch 360a is initialized for selecting the current fault diagnosis. In the step 60, the flag F is made "0". In the step 61, the ECO mode display LED 360c is lit. In the step 62, the current fault diagnosis is performed. After the step 62, the program returns to the step 57. For the second and the subsequent passages of the program, the flag F is made "0". Therefore, the program goes from the step 58 to a step 63. In the step 63 the selected condition of the compressor switch 360a is judged. When the current fault diagnosis is selected, the steps 61 and 62 are executed. Namely, the ECO mode display LED 360c is lit, and the current fault diagnosis is performed. When the past fault diagnosis is selected, steps 64 and 65 are executed. Namely, the A/C mode display LED 360b instead of the ECO mode display LED 360c is lit, and the past fault diagnosis is performed. After the current fault diagnosis of the step 62 or the past fault diagnosis of the step 65, the program returns to the step 57 to repeat the above-mentioned operation. When the reset of trouble-shooting is judged at the step 57, the program moves to a step 66, and the step 66 and a step 67 are executed. In the steps 66 and 67, the compressor switch 360a and all display LEDs are returned to the original air-conditioning display mode. Thereafter, air-conditioning control of the step 41 is performed.

FIGS. 6(A) and 6(B) are flow diagrams showing the current fault diagnosis of the step 62 of FIG. 5(C). Terminals e-h of FIG. 6(A) are connected to corresponding terminals e-h of FIG. 6(B). When the current fault diagnosis starts, the display of the past fault diagnosis is reset and a step 70 is executed. In the step 70, abnormality detection of the in-car sensor 29 is performed. If an abnormality is detected in the in-car sensor 29, then steps 71, and 72 are executed. In the step 71 the vent mode display LED 355b is lit. In the step 72, the auto display LED 352b is flashed. After these processes, the program goes out from the current fault diagnosis flow. When the in-car sensor is normal, abnormality detection of the ambient temperature sensor 30 is performed in a step 73. If an abnormality is detected in the ambient temperature sensor 30, then a step 74 and the step 72 are executed. In the step 74, the B/L mode display LED 356b is lit. After the steps 74 and 72, the program goes out from the current fault diagnosis flow. When the ambient temperature sensor 30 is normal, abnormality detection of the duct sensor 31 is performed in a step 75.

If an abnormality is detected in the duct sensor 31, then a step 76 and the step 72 are executed. In the step 76 the foot mode display LED 357b is lit. After the steps 76 and 72, the program goes out from the current fault diagnosis flow. When the duct sensor 31 is normal, abnormality detection of the air-mix door potentiometer 34 is performed in a step 77. If an abnormality is detected in the potentiometer 34, then a step 78 and the step 72 are executed. In the step 78 the defrost mode display LED 359b is lit. After the steps 78 and 72, the program goes out from the current fault diagnosis flow. When the potentiometer 34 is normal, abnormality detection of the temperature setting controller 350 is performed in a step 79. If an abnormality is detected in the temperature setting controller 350, then a step 80 and the step 72 are executed. In the step 80 the fresh mode display LED 354b is lit. After the steps 80 and 72, the program goes out from the current diagnosis flow. When the temperature setting controller 350 is normal, abnormality detection of the fan controller 351 is performed in a step 81. If an abnormality is detected, then a step 82 and the step 72 are executed. In the step 82 the recirculation mode display LED 354c is lit. After the steps 82 and 72, the program goes out from the current fault diagnosis flow. When the fan controller 351 is normal abnormality detection of the water temperature switch 33 is performed in a step 83. If an abnormality is detected in the water temperature switch 33, a step 84 and the step 72 are executed. In the step 84, the swing louver on/off display LED 353b is lit. After the steps 84 and 72, the program goes out from the current fault diagnosis flow. Abnormality of the water temperature switch 33 can be judged easily, for example, based on a water temperature display signal of the engine. When the water temperature switch 33 is normal, abnormality detection of the sun sensor 32 is performed in a step 85. If an abnormality is detected in the sun sensor 32, then a step 86 and the step 72 are executed. In the step 86, the foot/defrost mode display LED 358b is lit. After the steps 86 and 72, the program goes out from the current fault diagnosis flow. When the sun sensor 32 is normal, steps 87, 88 and 89 are executed. In the step 87, the vent mode display LED 355b is lit. In the step 88, the fresh mode display LED 354b is lit. In the step 89, the auto display LED 352b is lit. After the steps 87, 88 and 89, the program goes out from the current fault diagnosis flow. If an abnormality has occurred during diagnosing, then a fault existence and each fault portion can be identified by the flashing of the auto display LED 352b and the lighting of the corresponding display LED to each fault portion. When all of the diagnosed portions are normal during the diagnosis, it can be known that all the diagnosed portions are normal by the lighting of the vent mode display LED 355b, the fresh mode display LED 354b and the auto display LED 352b.

Figure 7A:
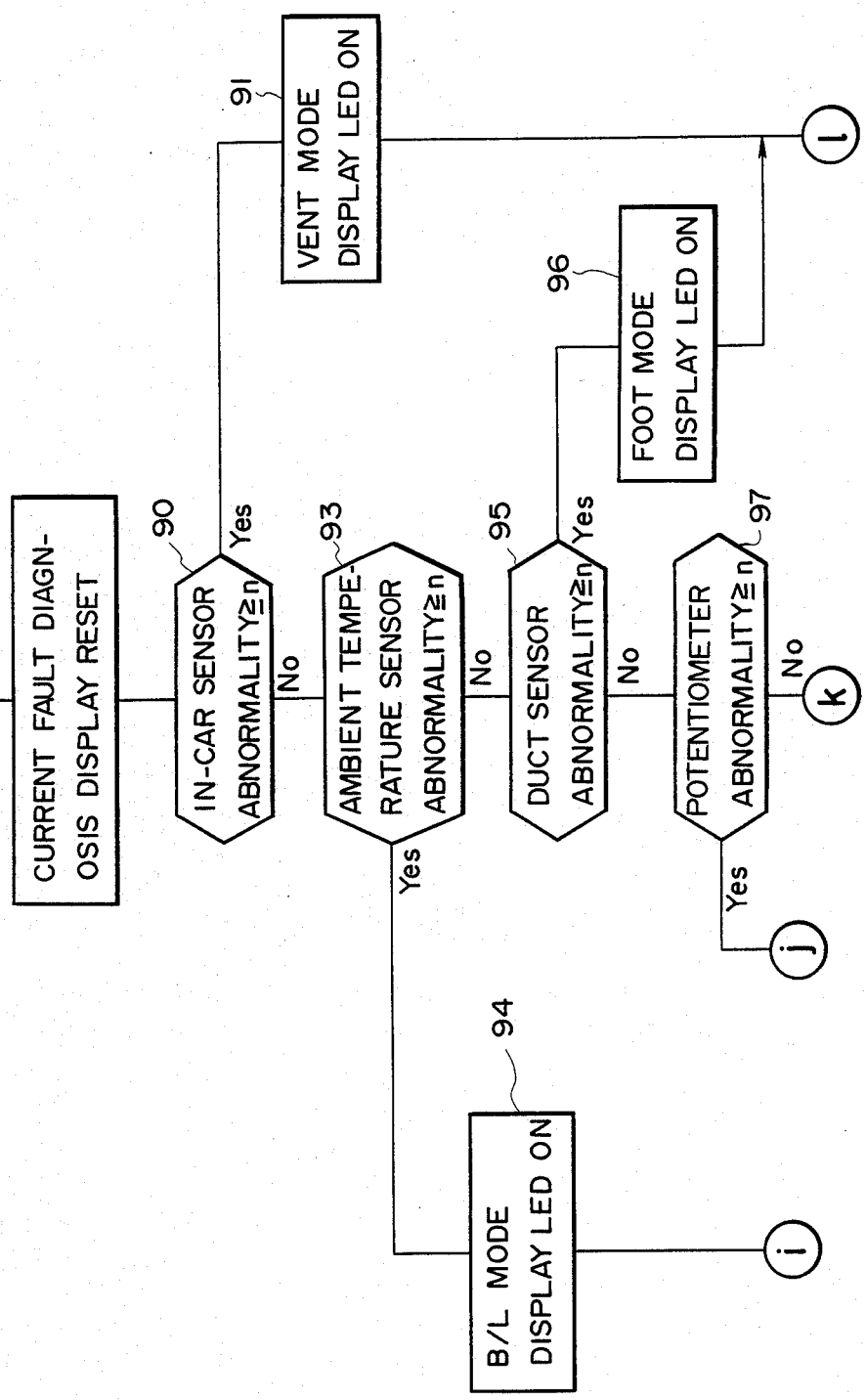

FIGS. 7(A) and 7(B) are flow diagrams showing the past fault diagnosis of the step 65 in FIG. 5(C). Terminals i-1 of FIG. 7(A) are connected to corresponding terminals i-1 of FIG. 7(B). When the past fault diagnosis starts, the display of the current fault diagnosis is reset and a step 90 is executed. In the step 90, the number of times an abnormality occurs in of the in-car sensor 29 is read out from the EEPROM 282, and whether or not the number of times the abnormality exceeds a predetermined value n is judged. If the number of times the abnormality of the in-car sensor 29 exceeds the predetermined value n, the in-car sensor 29 is judged to be in fault, and steps 91 and 92 are executed. In the step 91, the vent mode display LED 355b is lit. In the step 92, the auto mode display LED 352b flashes. After the steps 91 and 92, the program goes out from the past fault diagnosis flow. If the number of times the abnormality of the in-car sensor 29 is below the predetermined value n in a step 93, then the number of times the abnormality of the ambient temperature sensor 30 is read out from the EEPROM 282, and whether or not the number of times the abnormality of the ambient temperature sensor 30 exceeds the predetermined value n is judged. If the number of time the abnormality of the ambient temperature sensor 30 exceeds the predetermined value n, then the ambient temperature sensor 30 is judged to be in fault, and a step 94 and the step 92 are executed. In the step 94, the B/L mode display LED 356b is lit. After the steps 94 and 92, the program goes out from the past fault diagnosis flow. If the number of times the abnormality of the ambient temperature sensor 30 is below the predetermined value n is a step 95, then the number of times the abnormality of the duct sensor 31 is read out from the EEPROM 282, and whether or not the number of times the abnormality of the duct sensor 31 exceeds the predetermined value n is judged. If the number of times the abnormality of the duct sensor 31 exceeds the predetermined value n, then the duct sensor 31 is judged to be in fault, and a step 96, and the step 92 are executed. In the step 96 the foot mode display LED 357b is lit. After the steps 96 and 92, the program goes out from the past fault diagnosis flow. If the number of times the abnormality of the duct sensor 31 is below the predetermined value n in a step 97, then the number of times the abnormality of the air-mix door potentiometer 34 is read out from the EEPROM 282, and whether or not the number of times the abnormality of the potentiometer 34 exceeds the predetermined value n is judged. If the number of times the abnormality of the potentiometer 34 exceeds the predetermined value n, then the potentiometer 34 is judged to be in fault, and a step 98 and the step 92 are executed. In the step 98 the defrost mode display LED 359b is lit. After the steps 98 and 92, the program goes out from the past fault diagnosis flow. If the number of times the abnormality of the air-mix door potentiometer 34 is below the predetermined value n, then steps 99, 100 and 101 are executed. In the step 99, the vent mode display LED 355b is lit. In the step 100, the fresh mode display LED 354b is lit. In the step 101, the auto display LED 352b is lit. After the steps 99, 100 and 101, the program goes out from the past fault diagnosis flow. The predetermined value n, takes into account the number of times the dismounting of each diagnosed portion by repairs, checkings etc., is selected as 10 or so, for example. Also, the predetermined value n can be different values for different diagnosed portions, based on the experience from the number of times dismounting occurs for checking each diagnosed portion. Abnormalities derived from dismountings and remountings of diagnosed portions being repaired or checked are absorbed as the number of times the abnormality occurs within the predetermined value n. As a result, it is possible to diagnose efficiently abnormalities that lack repeatability, such as an imperfect contact and others. By flashing the auto display LED 352b and lighting each display LED corresponding to the respective fault portion, occurrence of faults before diagnosing along with the fault portion can be identified. Also, by lighting of the vent mode display LED 355b, the fresh mode display LED 354b and the auto display LED 352b, it can be identified that all diagnosed portions were normal before diagnosing.

As described in detail, according to the embodiments of the present invention, diagnosed portions in which abnormalities occur during troubleshooting and diagnosed portions having the number of times the abnormality exceeds the predetermined value at the troubleshooting can be distinguised from each other. Therefore, abnormalities due to dismountings and remountings of diagnosed portions in repairs and checkings are absorbed as the number of times the abnormality occurs within the predetermined value. Thereby, it is possible to diagnose efficiently fault portions having abnormalities that lack repeatability such an imperfect connection and others that occur before diagnosing.

Also, according to the embodiments of the present invention, since each diagnosed portion in which an abnormity occurs during the diagnosing and each diagnosed portion judged to be in fault based on an abnormality that occurs before diagnosing are selected alternatively and displayed by means of an existing switch of the operation unit of the air-conditioning system. It is possible to identify the diagnosed portions judged to be in fault whether they are fault portions having abnormalities that occur during diagnosing or fault portions having abnormalities that occur before diagnosing and lack repeatability. As a result, checkings and repairs for understanding whether or not abnormalities lacking repeatability become available, thereby facilitating finding causes of such abnormalities as well as applying suitable remedy measures. In addition, since the existing switch of the air-conditioning system is utilized, there is no need for any other switching means to be provided anew.

From the foregoing it will now be apparent that a new and improved troubleshooting apparatus has been found. It should be understood of course that the embodiment disclosed is merely illustrative and is not intended to limit the scope of the invention. Reference should be made to the appended claims, rather than the specification as indicating the scope of the invention.

What is claimed is:

1. Troubleshooting means for detecting faults in a plurality of sensored portions in an automobile air-conditioning system comprising:

abnormality detecting means for detecting abnormalities that occur in said plurality of sensored portions;

abnormality counting means for counting the number of said abnormalities detected in each of said plurality of sensored portions in response to said abnormality detecting means;

abnormality storing means for storing the number of said abnormalities for each of said plurality of sensored portions defected from said abnormality counting means in a rewritable nonvolatile memory;

past fault recognition means for comparing the number of said abnormalities in each of said plurality of sensored portions to a predetermined value in response to an external diagnosis request and developing a past fault signal for each of said plurality of sensored portions when said abnormalities of said abnormality storing means exceeds said predetermined value;

current fault recognition means for developing a current fault signal for each of said plurality of sensored portions in response to said abnormalities detected by said abnormality detecting means said current fault recognition means being executed after said external diagnosis request; and fault display means for distinctly displaying said past fault signal and said current fault signal in response to said past fault recognition means and said current fault recognition means.

2. Troubleshooting means according to claim 1, wherein said automobile air-conditioning system further comprises:

operation display means for displaying a plurality of operational conditions of said automobile air-conditioning system; and said fault display means for displaying said past fault signal and said current fault signal for each of said plurality of sensored portions on said operation display means.

3. Troubleshooting means for detecting faults in a plurality of sensored portions in an automobile air-conditioning system comprising:

diagnosis request detecting means for detecting a presence and an absence of an external request for diagnosis of the plurality of sensored portions;

first abnormality detecting means for detecting abnormalities that occur in a predetermined number of portions of said plurality of sensored portions in response to the absence of said external request for diagnosis;

abnormality counting means for counting the number of said abnormalities detected in each of said plurality of sensored portions in response to said first abnormality detecting means;

abnormality storing means for storing the number of said abnormalities for each of said plurality of sensored portions detected from said abnormality counting means in a rewritable nonvolatile memory;

past fault recognition means for comparing the number of said abnormalities in each of said plurality of sensored portions to a predetermined value in response to said external request and developing a past fault signal for said predetermined number of portions when said abnormalities of said abnormality storing means exceeds said predetermined value;

second abnormality detecting means for detecting abnormalities that occur in each of said plurality of sensored portions in response to the presence of said external request for diagnosis;

current fault recognition means for developing a current fault signal for each of said plurality of sensored portions in response to said abnormalities detected by said second abnormality detecting means; and fault display means for distinctly displaying said past fault signal and said current fault signal in response to said past fault recognition means and said current fault recognition means.

4. Troubleshooting means according to claim 3, wherein said diagnosis request detecting means detects the presence of said external request for diagnosis when an ignition switch is turned on while two different switches of said automobile air-conditioning system are operated simultaneously and said diagnosis request detecting means detects the absence of said external request for diagnosis when said ignition switch is turned on while two different switches are not operated simultaneously.

5. Troubleshooting means according to claim 3, wherein said plurality of sensored portions comprise:

an in-car sensor for detecting an in-car temperature of an automobile;

a duct sensor for detecting a temperature of air blown out from an evaporator;

a potentiometer for detecting an opening angle of an air-mix door;

a temperature setting controller for setting the in-car temperature;

a fan controller for adjusting a blower speed;

a water temperature switch for detecting a water temperature of a heater core; and a sun sensor for detecting a quantity of solar radiation received by the automobile;

said first abnormality detecting means detects the in-car sensor, the ambient temperature sensor, the duct sensor and the potentiometer; and said second abnormality detecting means detects the in-car sensor, the ambient temperature sensor, the duct sensor, the potentiometer, the temperature setting controller, the fan controller, the water temperature switch and the sun sensor.

6. Troubleshooting means according to claim 3, wherein said automobile air-conditioning system further comprises:

operation display means for displaying a plurality of operational condition of said automobile air-conditioning system; and said fault display means for displaying said past fault signal and said current fault signal for each of said plurality of sensored portions on said operation display means.

7. Troubleshooting means for detecting faults in a plurality of sensored portions in an automobile air-conditioning system comprising:

abnormality detecting means for detecting abnormalities that occur in each of said plurality of sensored portions;

abnormality counting means for counting the number of said abnormalities detected in each of said plurality of sensored portions in response to said abnormality detecting means;

abnormality storing means for storing the number of said abnormalities for each of said plurality of sensored portions detected from said abnormality detecting means in a rewritable nonvolatile memory;

past fault recognition means for comparing the number of said abnormalities in each of said plurality of sensored portions to a predetermined value in response to an external diagnosis request and developing a past fault signal for each of said plurality of sensored portions when said abnormalities of said abnormality storing means exceeds said predetermined value;

current fault recognition means for developing a current fault signal for each of said plurality of sensored portions in response to said abnormalities detected by said abnormality detecting means said current fault recognition means being executed after said external diagnosis request;

fault display selecting means for alternatively selecting said past fault recognition means and said current fault recognition means in response to a fault selecting switch of said automobile air-conditioning system; and fault display means for distinctly displaying said past fault signal and said current fault signal in response to said fault display selecting means.

8. Troubleshooting means according to claim 7, wherein said fault display selecting means responds to a compressor switch of said automobile air-conditioning system.

9. Troubleshooting means according to claim 7, wherein said automobile air-conditioning system further comprises:
   operation display means for displaying a plurality of operational conditions of said automobile air-conditioning system; and
   said fault displaying means for displaying said past fault signal and said current fault signal for each of said plurality of sensored portions in said operation display means.

10. Troubleshooting means for detecting faults in a plurality of sensored portions in an automobile air-conditioning system comprising:
   diagnosis request detecting means for detecting a presence and an absence of an external request for diagnosis of the plurality of sensored portions;
   first abnormality detecting means for detecting abnormalities that occur in a predetermined number of portions of said plurality of sensored portions in response to the absence of said external request for diagnosis;
   abnormality counting means for counting the number of said abnormalities detected in each of said plurality of sensored portions in response to said first abnormality detecting means;
   abnormality storing means for storing the number of said abnormalities for each of said plurality of sensored portions detected from said abnormality counting means in a rewritable nonvolatile memory;
   past fault recognition means for comparing the number of said abnormalities in each of said plurality of sensored portions to a predetermined value in response to said external request and developing a past fault signal for said predetermined number of portions when said abnormalities of said abnormality storing means exceeds said predetermined value;
   second abnormality detecting means for detecting abnormalities that occur in each of said plurality of sensored portions in response to the presence of said external request for diagnosis;
   curent fault recognition means for developing a current fault signal for each of said plurality of sensored portions in response to said abnormalities detected by said second abnormality detecting means;
   fault display selecting means for alternatively selecting said past fault recognition means and said current fault recognition means in response to a fault selecting switch of said automobile air-conditioning system; and
   fault display means for distinctly displaying said past fault signal and said current fault signal in response to said fault display selecting means.

11. Troubleshooting means according to claim 10, wherein said fault display selecting means responds to a compressor switch of said automobile air-conditioning system.

12. Troubleshooting means according to claim 10, wherein said diagnosis request detecting means detects the presence of said external request for diagnosis when an ignition switch is turned on while two different switches of said automobile air-conditioning system are operated simultaneously and said diagnosis request detecting means detects the absence of said external request for diagnosis when said ignition switch is turnd on while two different switches are not operated simultaneously.

13. Troubleshooting means according to claim 10, wherein said plurality of sensored portions comprise:
   an in-car sensor for detecting an in-car temperature of an automobile;
   an ambient temperature sensor for detecting an ambient temperature of the automobile;
   a duct sensor for detecting a temperature of air blown out from an evaporator;
   a potentiometer for detecting an opening angle of an air-mix door;
   a temperature setting controller for setting the in-car temperature;
   a fan controller for adjusting a blower speed;
   a water temperature switch for detecting a water temperature of a heater core; and
   a sun sensor for detecting a quantity of solar radiation received by the automobile;
   said first abnormality detecting means detects the in-car sensor, the ambient temperature sensor, the duct sensor and the potentiometer; and
   said second abnormality detecting means detects the in-car sensor, the ambient temperature sensor, the duct sensor, the potentiometer, the temperature setting controller, the fan controller, the water temperature switch and the sun sensor.

14. Troubleshooting means according to claim 10, wherein said automobile air-conditioning system further comprises:
   operation display means for displaying a plurality of operational conditions of said automobile air-conditioning system; and
   said fault display means for displaying said past fault signal and said current fault signal for each of said plurality of sensored portions on said operation display means.

15. A method for detecting faults by troubleshooting means in a plurality of sensored portions in an automobile air-conditioning system comprising the steps of:
   detecting abnormalities occurring in said plurality of sensored portions by abnormality detecting means;
   counting the number of said abnormalities detected in each of said plurality of sensored portions by abnormality counting means in response to said abnormality detecting means;
   storing the number of said abnormalities detected by said abnormality counting means for each of said plurality of sensored portions in a rewritable nonvolatile memory;
   developing a past fault signal for each of said pluality of sensored portions when said abnormalities in said abnormality storing means exceeds a predetermined value when comparing the number of said abnormalities in each of said plurality of sensored portions to said predetermined value in past fault recognition means in response to an external diagnosis request;
   developing a current fault signal for each of said plurality of sensored portions in current fault recognition means in response to said abnormalities detected by said abnormality detecting means, said current fault recognition means being executed after said external diagnosis request; and
   distinctly displaying said past fault signal and said current fault signal by fault display means in response to said past fault recognition means and said current fault recognition means.

* * * * *